United States Patent [19]
Herzl

[11] 3,946,608
[45] Mar. 30, 1976

[54] VORTEX FLOWMETER WITH EXTERNAL SENSOR

[75] Inventor: Peter J. Herzl, Morrisville, Pa.

[73] Assignee: Fischer & Porter Company, Warminster, Pa.

[22] Filed: Feb. 26, 1974

[21] Appl. No.: 445,869

[52] U.S. Cl. ............................................ 73/194 VS
[51] Int. Cl.² ........................................... G01F 1/32
[58] Field of Search ................................. 73/194 B

[56] References Cited
UNITED STATES PATENTS

| | | | |
|---|---|---|---|
| 1,935,445 | 11/1933 | Heinz | 73/194 |
| 2,383,405 | 8/1945 | Merrell et al. | 73/457 |
| 2,548,809 | 4/1951 | Norman | 73/457 |
| 2,809,520 | 10/1957 | Richard, Jr. | 73/194 |
| 2,813,424 | 11/1957 | Liepmann et al. | 73/194 |
| 3,116,639 | 1/1969 | Bird | 73/194 |
| 3,452,594 | 7/1969 | Dale | 73/194 |
| 3,683,691 | 8/1972 | Kivenson | 73/194 |
| 3,722,273 | 1/1971 | Yamasaki | 73/194 |
| 3,796,095 | 3/1974 | Fussell, Jr. | 73/194 |

OTHER PUBLICATIONS

Yamasaki et al., "The Karman Vortex Flowmeter", in J. Soc. Inst. Control (Japan), Vol. No. 3, Mar. '71, pp. 173 & 178.

Primary Examiner—Herbert Goldstein

[57] ABSTRACT

A vortex flowmeter for installation in a water or other line requiring periodic flow rate testing. The flowmeter includes a flow tube forming a passage for the fluid to be metered and an obstacle assembly mounted in the tube and capable of generating fluidic oscillations causing a deflectable section of the assembly to vibrate at a corresponding frequency proportional to flow rate. The vibrations of the deflectable section are transmitted to a coupling point outside of the flow tube, whereby flow rate may be determined by an external sensor engaging the coupling point to produce a signal which is fed to a portable test set serving to convert the signal into a flow rate reading.

7 Claims, 5 Drawing Figures

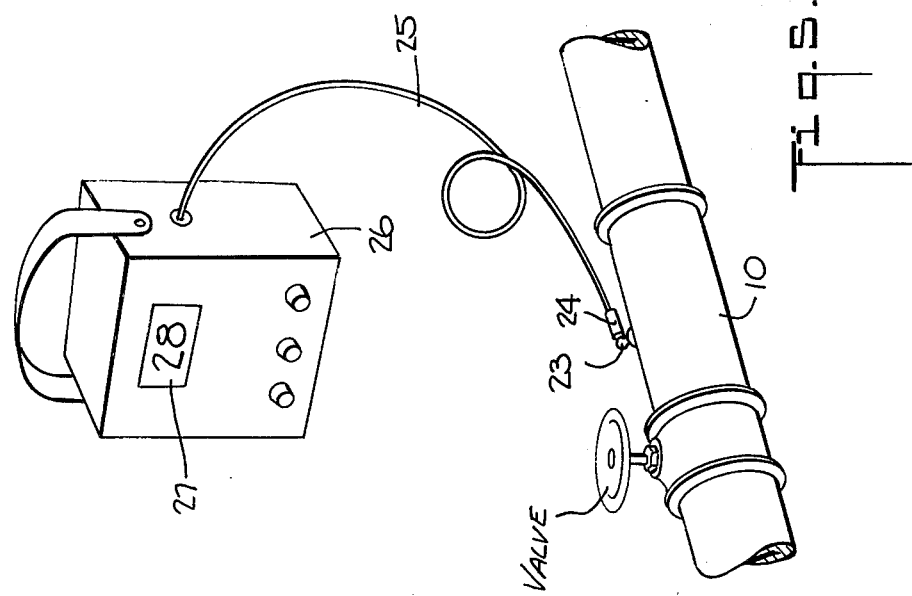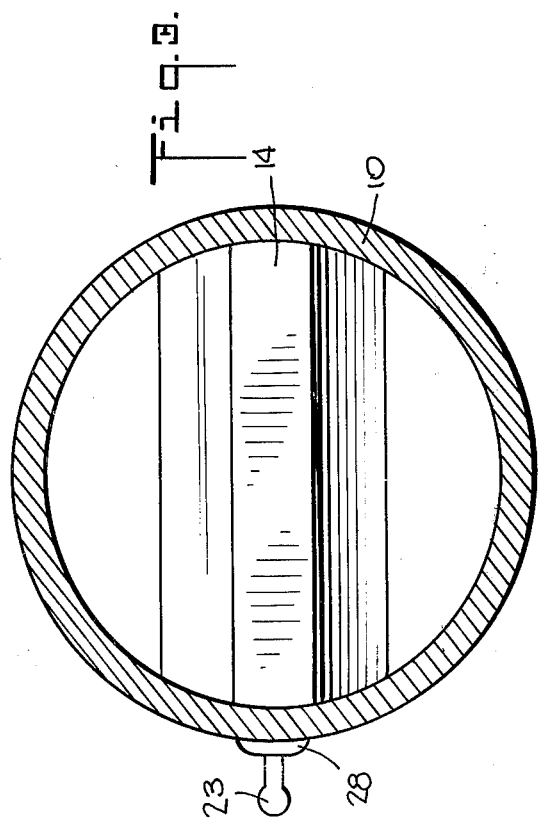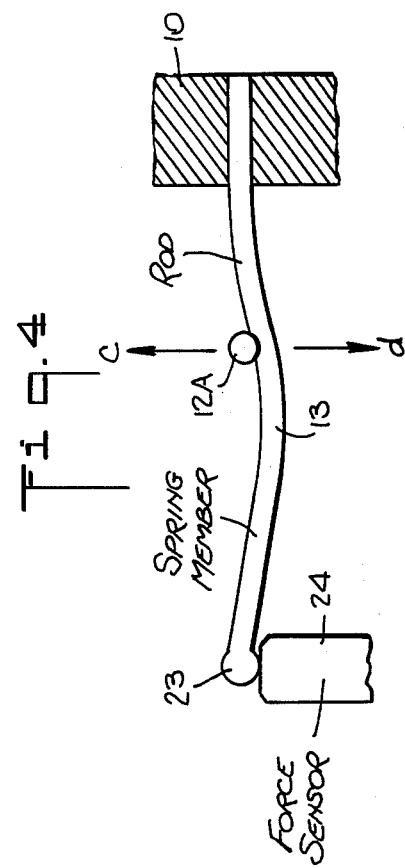

VORTEX FLOWMETER WITH EXTERNAL SENSOR

BACKGROUND OF THE INVENTION

This invention relates generally to flow measuring apparatus, and more particularly to a vortex-type flowmeter adapted to operate in conjunction with an external sensor coupled to a portable read-out device whereby the same sensor may be used to take readings from a large number of installed flowmeters.

After an oil well is drilled, oil may flow freely, producing up to a thousand barrels a day as a result of high reservoir pressure generated by natural gas trapped with the oil or the pressure of water layers above the oil. Ultimately, artificial lift expedients are required to increase oil recovery. One widely used form of secondary recovery is the waterflood technique wherein pressurized water is forced through an injection well adjacent the site of the producing well, the injected water flooding the oil bearing region and providing the necessary pressure for oil extraction.

In a secondary recovery system of this type, oil intermingled with water is yielded by the producing well. The water is thereafter separated from the oil and is returned to injection pumps delivering water to the injection well. These pumps supply pressurized water to several injection wells, so that the secondary recovery system involves a network of water lines leading to a group of functioning wells.

In maintaining and servicing a waterflood system, it is necessary to periodically check the water flow rate at various points in the water line network. The present practice is to effect measurement by means of turbine meters installed in the water lines. In the conventional turbine meter, the turbine rotor is mounted within the flow conduit, a permanent magnet being incorporated in the rotor. The rotating magnet induces an alternating-current in a pick-up coil located in the external housing of the meter, the freqency of the generated signal being proportional to the volumetric flow rate. The frequency of the signal is converted into a reading of flow rate.

Since turbine meters are relatively expensive, and a secondary oil recovery system requires a large number of such meters, one recent innovation has been to omit the pick-up coil from the meter and to provide a separate pick-up coil coupled to a battery-operated test set which affords a flow rate reading. This practice is feasible since it is only necessary for an operator to briefly check flow rate at the meter installation and then, if necessary, to make a manual valve adjustment to correct flow rate. Thus the operator who carries the pick-up coil and the test set makes a tour of the various turbine meter installations to check the flow rate.

The main drawback of turbine flowmeters in the context of a secondary oil recovery system is that because it has a rotor which is exposed to the water, there is a reliability problem in that the water being measured is often dirty and tends to foul and degrade the rotor and its bearings, particularly if the water contains abrasive particles and corrosive chemical constituents. Hence after prolonged use, the turbine meter may become inoperative or inaccurate.

SUMMARY OF THE INVENTION

In view of the foregoing, it is the main object of this invention to provide a vortex-type flowmeter adapted to operate in conjunction with an external sensor coupled to a portable read-out device whereby the same sensor may be used to take readings from a large number of installed flowmeters.

A significant advantage of a vortex-type flowmeter as distinguished from a turbine meter is that the former has no exposed moving parts and is therefore not subject to wear and deterioration.

More particularly, it is an object of this invention to provide a vortex-type flowmeter having an obstacle assembly disposed within a flow conduit, the assembly being capable of generating fluidic oscillations causing a deflectable section of the assembly to vibrate microscopically at a corresponding rate, the vibration being transmitted to a coupling point outside of the meter casing whereby the frequency of vibrations may be detected by an external sensor brought into engagement with the coupling point to afford a reading of flow rate.

Also an object of this invention is to provide a low-cost and reliable vortex type flowmeter which may readily be installed in a water or other line requiring occasional flow rate measurement. While the invention is described herein as it operates in a secondary oil recovery system, it will be appreciated that the same meter is useable in any environment requiring an occasional flow rate test, whereby the same sensor and its associated test set may be used to obtain readings from a large number of flowmeter installations. Another advantage of this arrangement is that the installed flowmeter is altogether devoid of electrically-powered devices so that there is no danger from the meter in environments that cannot tolerate unattended electrical circuits.

Briefly stated these objects are attained in a flowmeter including a flow tube forming a passage for the fluid to be metered and an obstacle assembly disposed in the tube and capable of generating strong fluidic oscillations which cause a deflectable section of the assembly to vibrate microscopically at a corresponding rate. Disposed within the deflectable section is a rod which is caused to vibrate at the same rate, the rod vibration being transferred to a probe placed within a non-deflectable section of the obstacle assembly and extending to the exterior of the tube, whereby the vibrations of the deflectable section within the conduit are transmitted to the exterior thereof.

The probe extension terminates in a coupling head which is engageable by a piezoelectric sensor or equivalent means adapted to covert the probe vibrations into a corresponding electrical signal whose frequency is proportional to flow rate. The sensor is coupled to a test set serving to convert the signal into a flow rate reading.

OUTLINE OF DRAWING

For a better understanding of this invention as well as further features thereof, reference is made to the following detailed description to be read in conjunction with the accompanying drawing wherein:

FIG. 2 is a section taken through the meter shown in FIG. 1 in the plane indicated by line 2 — 2 in. FIG. 1;

FIG. 3 is a front view of the meter;

FIG. 4 shows the probe element of the meter; and

Figure 1:
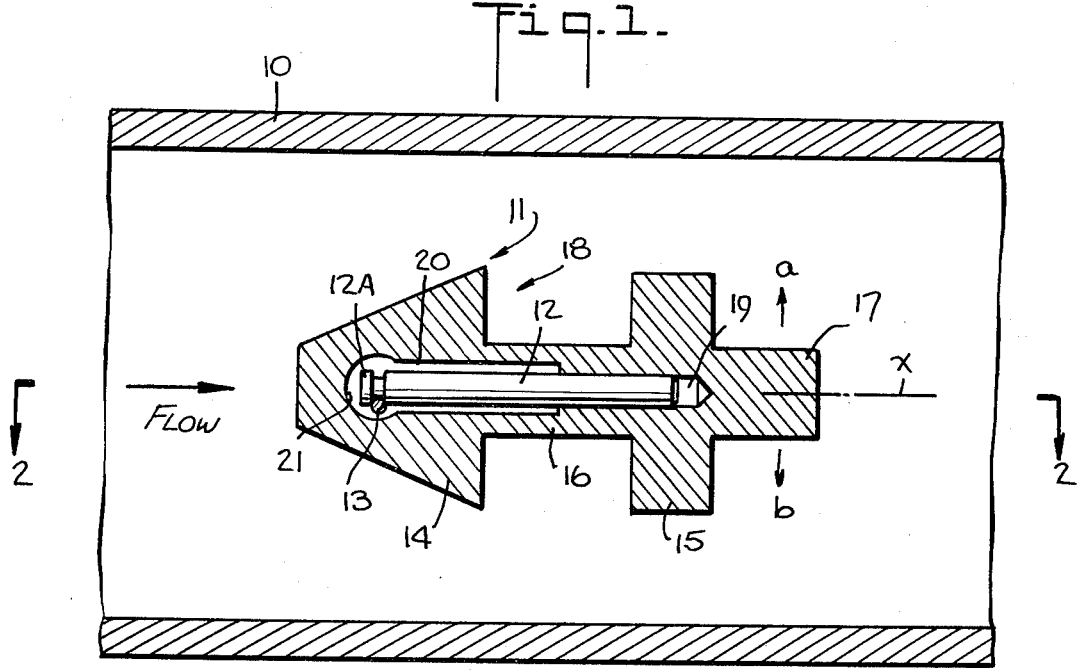
FIG. 1 is a longitudinal section taken through a vortex flowmeter in accordance with the invention.
Figure 2:
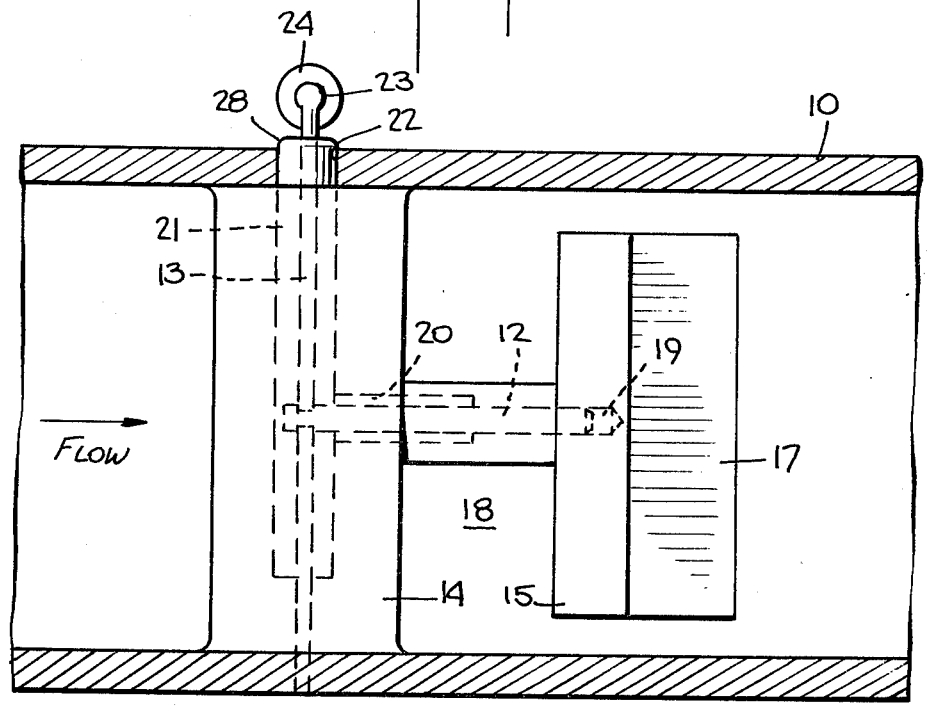

FIG. 5 schematically illustrates a flowmeter installation being tested by a sensor system in accordance with the invention.

DESCRIPTION OF INVENTION

It is well known that under certain circumstances, the presence of an obstacle in a flow conduit will give rise to periodic vortices. For small Reynolds numbers, the downstream wake is laminar in nature, but at increasing Reynolds numbers, regular vortex patterns are formed. These patterns are known as Karman vortex streets. The frequency at which vortices are shed in a Karman vortex street is a function of flow rate.

One known form of vortex type flowmeter is disclosed in the Rodley U.S. Pat. No. 3,572,117 in which a bluff body or obstacle is mounted within a flow conduit, a sensor being placed behind the bluff body to sense the fluidic oscillations generated by the flow past the bluff body, thereby producing a signal whose frequency depends on flow velocity. The output of the sensor is applied to a signal conditioner that converts the output into a digital signal which is counted and applied to a read-out device to indicate the flow rate.

An improved form of vortex-type flowmeter is disclosed in Burgess U.S. Pat. No. 3,589,185 wherein the signal derived from the fluid oscillation is relatively strong and stable to afford a favorable signal-to-noise ratio, insuring accurate flow-rate information over a broad range. In this meter, the obstacle assembly mounted in the flow conduit is constituted by a block positioned across the conduit with its longitudinal axis at right angles to the direction of fluid flow, a strip being similarly mounted behind the block and being spaced therefrom to define a gap which serves to trap Karman vortices and to strengthen and stabilize the vortex street. This vortex street is sensed to produce a signal whose frequency is proportional to flow rate.

The sensor in the Burgess patent is in the form of a thermistor which is electrically heated by a constant current and is cooled by the fluidic oscillations. The thermistor has a large negative temperature coefficient of resistance, as a consequence of which its internal resistance varies periodically in accordance with the fluidic oscillations in the downstream wake. The electrical signal resulting from the periodic variations in resistance is applied to an indicator calibrated in terms of flow rate.

In the copending Burgess application SN 354,803 filed Apr. 26, 1973 the entire disclosure of which is incorporated herein by reference a vortex type flowmeter is disclosed having an obstacle assembly adapted to generate strong stabilized fluidic oscillations causing a deflectable section of the assembly to vibrate at a corresponding rate. These mechanical vibrations are sensed to produce a signal whose frequency is proportional to the flow rate of the fluid. In the flowmeter disclosed in this copending application the mechanical vibrations are sensed by one or more strain gauges mounted on the deflectable section to produce periodic changes in electrical resistance, resulting in a signal whose frequency is proportional to the vibratory rate and hence to the flow rate of the fluid. In the present invention, a similar obstacle assembly is employed, but the vibrations of the deflectable section are detected by a sensor which is external to the assembly.

This arrangement is shown in FIGS. 1 to 4 wherein a flowmeter in accordance with this invention includes a flow tube 10 interposed in the water line for a secondary oil recovery system or in any other environment in which it is necessary to conduct a periodic test of flow rate to determine whether proper flow conditions exist. For this purpose, the flow tube may be provided with end flanges to facilitate coupling to the line.

Mounted within flow tube 10 is an obstacle assembly generally designated by numeral 11, the assembly including a deflectable section which is responsive to the Karman Vortex street and is caused to vibrate microscopically at a frequency which is proportional to flow rate. Incorporated in the obstacle assembly is a vibration transmitter composed of a rod 12 and a probe 13.

Flow tube 10 which is shown as having a circular cross section but which may in other cross-sectional forms, includes an inlet 10A into, which the water to be metered is introduced. The flow impinges on obstacle assembly 11 which acts to divide the flow around the obstacle, producing fluidic perturbations in the form of a Karman Vortex. The nature of this phenomenon is explained in the text by Schlictling "Boundary Layer Theory" (McGraw-Hill 1960).

Obstacle assembly 11 is constituted by a transversely-mounted front section 14 and a rear section 15 mounted behind the front section by a cantiliver support in the form of a flexible web 16. Extending downstream from rear section 15 is a tail 17. Front section 14 is a contoured block having a triangular or delta-shaped cross-section which is uniform throughout the long axis of the block, this axis being perpendicular to the flow axis X of the flow tube. The extremities of the front section are secured to the wall of the tube whereby the front section is held fixedly within the tube. The apex of block 16 faces the incoming fluid, the inclined sides thereof forming leading edges which are swept by the fluid flow to create vortices. The invention is not limited to obstacles or bodies of this shape, for other shapes may be used, such as those disclosed in Burgess U.S. Pat. No. 3,589,185 or in Bird U.S. Pat. No. 3,116,639.

Rear section 15 takes the form of a non-streamlined body having a rectangular cross-section which is maintained by web 16 in spaced relation to the front section, the plane of the rear section being parallel to the flat base of the front section. The rear section shape is such as to interfere with the vortex street, and the gap 18 established between the front section block and the rear section tends to trap the vortices and to strengthen and stabilize the vortex street produced thereby.

Because rear section 15 is cantilevered by means of flexible web 16, it is deflectable. The web, though bendable, has sufficient rigidity so as to permit only a slight deflection of the rear section. As a consequence of the fluidic oscillations produced within the flow tube, the deflectable rear section 15 is excited into vibration at a rate corresponding to the frequency of the oscillations.

The natural resonance of the deflectable rear section is such as to be well outside the normal frequency range of the meter whereby mechanical resonance peaks are absent and the amplitude of the vibrating motion accurately reflects the amplitude of the fluidic oscillations. This vibratory motion is enhanced by tail 17. The downstream section of the assembly carries out two functions, for this section which interferes with the wake not only stabilizes it to enhance its detectability, but its vibratory motion gives rise to the output signal.

Because the deflectable system is relatively rigid, the total excursion of the rear section is minute even at the highest amplitudes of fluidic oscillation, so that metal fatigue of the supporting web, as a result of the vibrating action, is minimized and failures do not arise after prolonged operation.

It is important to note that the magnitude of deflection is not of primary importance, for the flowrate information is given by the frequency, not the amplitude of vibration. Hence while the deflection magnitude is made extremely small in order to provide an acceptable fatigue life, this does not militate against a readable output of varying frequency.

In addition to its fatigue limitations, a large displacement design is also disadvantageous in that flowmeter linearity is dependent on the consistency of the width of the vortex street. Large motions tend to bring about changes in vortex street width with changes in frequency, thereby introducing a non-linearity.

The minute vibrations of the deflectable rear section of the obstacle assembly are sensed outside of flow tube 10 rather than within the tube as in the above-identified Burgess patent application. For this purpose, the vibrations are transmitted by rod 12 whose rear portion is socketed within a bore 19 which extends in a path coincident with flow tube axis X from a point about midway in web 16 to a point at the junction of rear section 15 and tail 17. The front portion of rod 12 lies freely within a relatively large diameter bore 20 communicating with the smaller diameter bore 19 and extending well into front section 14.

The vibrating motion of rear section 15 and of tail 17 attached thereto is represented in FIG. 1 by letters $a - b$, and since the rear portion of rod 12 is socketed in this section, the front portion of the rod vibrates therewith. This vibratory action at the tip 12A of the rod is indicated in FIG. 4 by letters $c - d$. The vibrating motion of the rod is transferred to the exterior of the flow tube by probe 13 which is formed of spring material, one end of the probe being anchored in the wall of the flow tube. Probe 13 extends through an internal bore 21 formed in non-deflectable front section 14 along an axis at right angles to tube axis X, the bore registering with a small opening 22 in the wall of the flow tube. The free end of probe 13 protrudes through opening 22 and terminates in a coupling head 23. Opening 22 in the flow tube is sealed by a rubber diaphragm 28.

As shown in FIG. 4, probe 13 is bent or otherwise shaped so that the probe which is of spring material is biased away from tip 12A of the vibrating rod. When, however, coupling head 23 is depressed by an external sensor 24, the body of the probe is shifted so that it is received within a slot in tip 12A and is thereby brought into operative engagement with rod 12. In this way, the vibrations of rod 12 are transferred by probe 13 to the external sensor 24. Thus the probe is normally quiescent and vibrates briefly only during an actual flow rate test, thereby minimizing possible wear.

Any sensor capable of responding to a vibratory action to produce a corresponding electrical signal may be used in conjunction with the coupling head 23 of the probe. A preferred sensor for this purpose is a quartz piezoelectric load cell, such as the "Piezotron" load cell (922 series) manufactured by Kistler Instrument company of Redmond, Washington. This is a very stiff, rugged force sensor responsive to minute incremental forces and useable in environments contaminated by dust, dirt or moisture without any adverse effect on signal transmission.

The output of sensor 24 is connected, as shown in FIG. 5, by a cable 25 to a portable test set 26 wherein the output is converted into a digital signal and applied to a suitable indicator 27 to provide a flow rate reading.

Thus, an operator equipped with a sensor and test set can readily check flow rate simply by pressing the sensor to the exposed coupling head 23 of the vortex meter installed in the water line. And using the same equipment, the operator can take readings at all other vortex meter installations. Since the installed meter has no moving part, it presents no reliability problem and can be depended on to provide accurate readings at all times.

While there has been shown a preferred embodiment of the invention, it will be appreciated that many changes may be made therein without departing from the essential spirit of the invention. For example, instead of a force sensor to detect the vibrations at the coupling head 23 of the meter, one may incorporate a permanent magnet in the coupling head and then make use of an inductive pick-up coil to provide the desired output. Also the vibration transmitter, instead of being composed of two elements (rod and probe), may be formed of a single curved transmitting line attached at one end to the deflectable section and passing out of the obstacle assembly to an exterior coupling point.

I claim:

1. A vortex-type flowmeter installable in a water or other fluid line requiring periodic flow rate testing, said flowmeter comprising:
  A a flow tube forming a conduit for the fluid to be metered, said tube being insertable in said line,
  B an obstacle assembly mounted in the tube, said assembly having a fixed section mounted across said tube and a deflectable section disposed behind said fixed section, said assembly being capable of generating a vortex street creating fluidic oscillations in said tube and causing said deflectable section to vibrate mechanically at a corresponding frequency proportional to flow rate, said deflectable section being in the form of a non-streamlined body shaped to interfere with the vortex street and being attached to the fixed section by a flexible web to define a gap between the two sections,
  C means to mechanically transmit the mechanical vibrations of said deflectable section through a passage within said fixed section to a coupling point on the exterior of said tube, and
  D portable test set means external to said tube and including a sensor operatively engageable with said coupling point to convert the mechanical vibrations at the coupling point to an electrical signal and to indicate said signal to provide a flow rate reading, said sensor being removable from said coupling point whereby the same test set means is usable to obtain a reading from any one of a multiplicity of like installed flowmeters.

2. A flowmeter as set forth in claim 1, further including a tail extending rearwardly from the deflectable section.

3. A flowmeter as set forth in claim 1, wherein said transmission means is constituted by a rod anchored in the deflectable section, the front portion of the rod lying freely within said passage in the fixed section whereby the tip of the rod vibrates at the same rate as the deflectable section, and a probe extending through said passage in said fixed section, one end of the probe being anchored, the other end thereof protruding through an opening in the flow tube and terminating at said coupling point in a coupling head, said rod tip being engageable with said probe, whereby the vibrations of said tip are transmitted by said probe to said coupling head.

4. A flowmeter as set foth in claim 3, further including a diaphragm sealing said opening.

5. A flowmeter as set forth in claim 4, wherein said probe is made of spring material and is normally biased away from said rod tip, said probe engaging said tip only when said coupling head is pressed by a sensor.

6. A flowmeter as set forth in claim 1, wherein said sensor is a quartz piezoelectric force cell.

7. A Vortex-type flowmeter installable in a water or other fluid line requiring periodic flow rate testing, said flowmeter comprising:
   A a flow tube forming a conduit for the fluid to be metered, said tube being insertable in said line,
   B an obstacle assembly mounted in the tube, said assembly being constituted by a front section fixedly mounted across the tube and contoured to cause flow separation and a vortex street having a periodicity that is a function of flow rate and a deflectable section cantilevered behind the front section to define a gap, said deflectable section being slightly deflectable to a degree in which the maximum deflection is not in excess of 0.002 inches, said assembly being capable of generating fluidic oscillations in said tube causing said deflectable section to vibrate at a corresponding frequency proportional to flow rate,
   C means to transmit the vibrations of said deflectable section through a passage in said fixed section to a coupling point on the exterior of said tube, and
   D portable test set means external to said tube and including a sensor operatively engageable with said coupling point to convert the vibrations at the coupling point to an electrical signal and to indicate said signal to provide a flow rate reading, said sensor being removable from said coupling point whereby said test set means is usable to obtain a reading from any one of a multiplicity of like installed flowmeters.

* * * * *